(No Model.) 4 Sheets—Sheet 1.

C. B. BEACH.
APPARATUS FOR CONVERTING STEEL TIRES INTO BARS OR BILLETS.
No. 335,879. Patented Feb. 9, 1886.

ATTEST- J. Henry Kaiser. Harry L. Ames.

INVENTOR. Clifton B. Beach, by George H. Christy, Atty.

(No Model.)
C. B. BEACH
APPARATUS FOR CONVERTING STEEL TIRES INTO BARS OR BILLETS.
No. 335,879. Patented Feb. 9, 1886.
4 Sheets—Sheet 2.
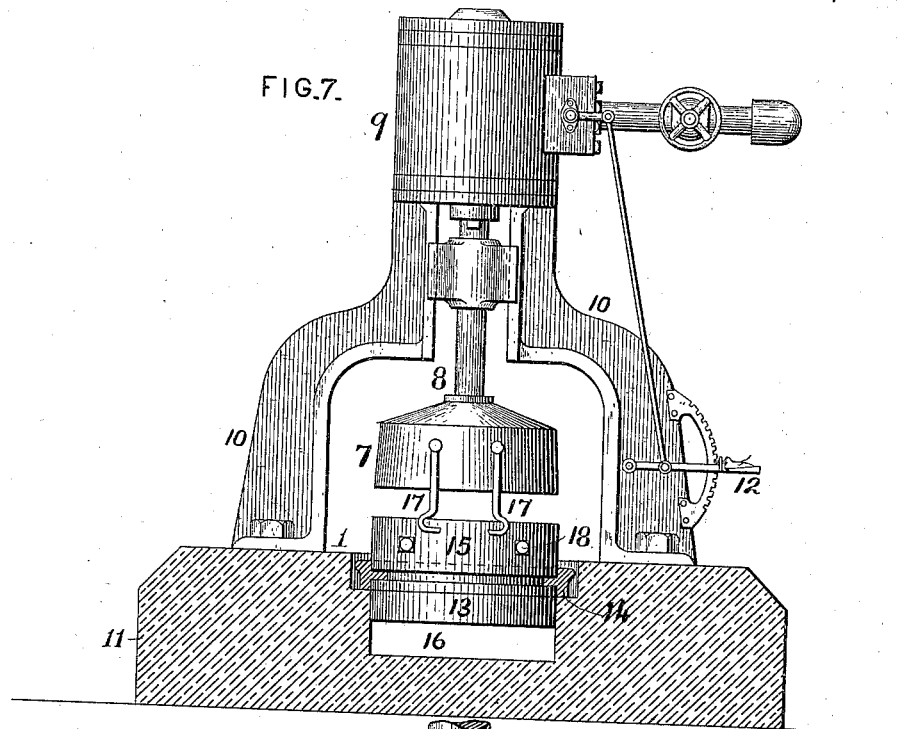
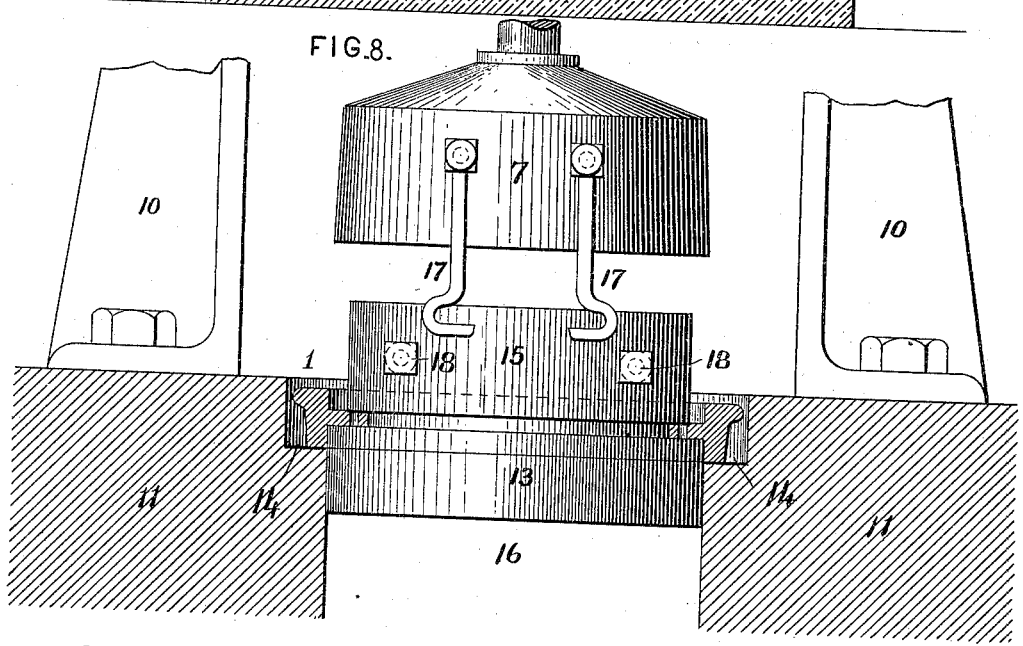

(No Model.) 4 Sheets—Sheet 3.

C. B. BEACH.
APPARATUS FOR CONVERTING STEEL TIRES INTO BARS OR BILLETS.

No. 335,879. Patented Feb. 9, 1886.

ATTEST:
J. Henry Kaiser.
Harry L. Ames.

INVENTOR:
Clifton B. Beach
By George H. Christy Atty (No Model.) 4 Sheets—Sheet 4.
C. B. BEACH.
APPARATUS FOR CONVERTING STEEL TIRES INTO BARS OR BILLETS.
No. 335,879. Patented Feb. 9, 1886.
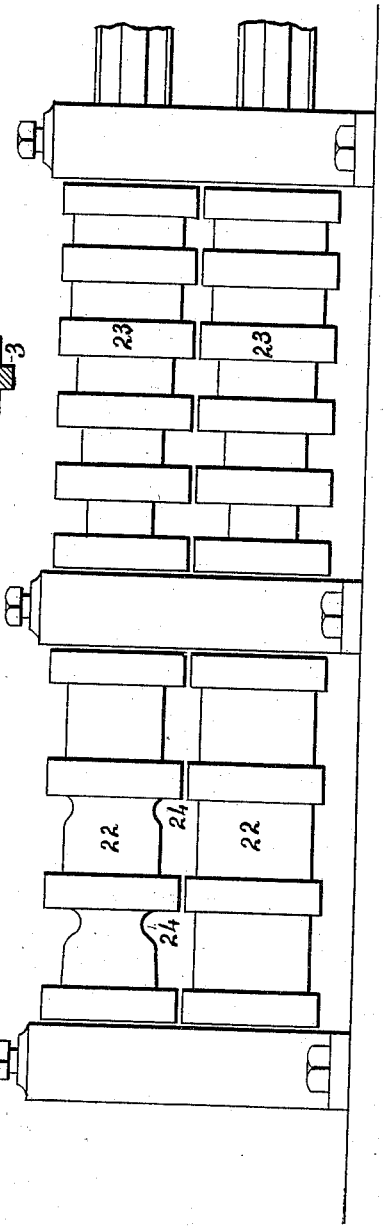
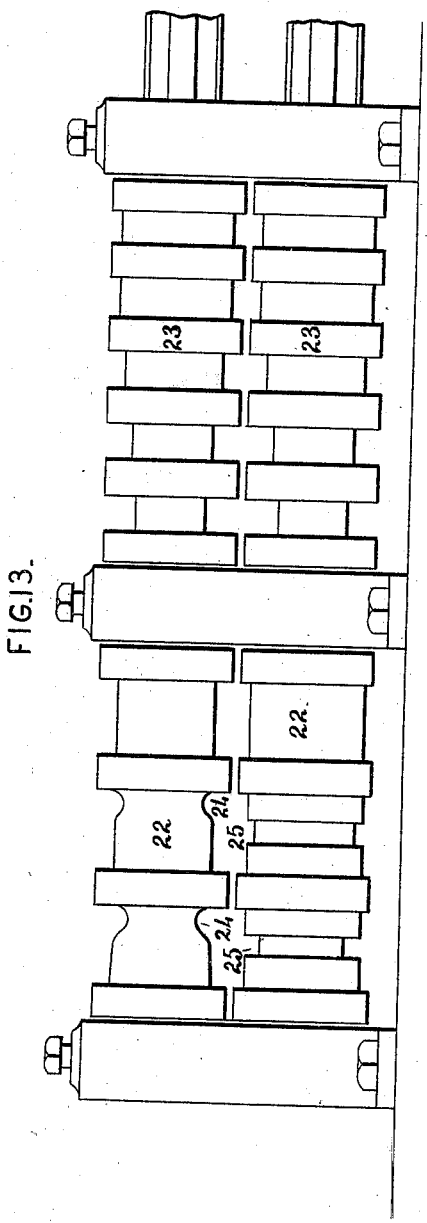

UNITED STATES PATENT OFFICE.

CLIFTON B. BEACH, OF CLEVELAND, OHIO.

APPARATUS FOR CONVERTING STEEL TIRES INTO BARS OR BILLETS.

SPECIFICATION forming part of Letters Patent No. 335,879, dated February 9, 1886.

Application filed July 10, 1885. Serial No. 171,181. (No model.)

*To all whom it may concern:*

Be it known that I, CLIFTON B. BEACH, residing at Cleveland, in the county of Cuyahoga and State of Ohio, a citizen of the United States, have invented or discovered certain new and useful Improvements in Apparatus for Converting Steel Railroad-Tires into Bars or Billets, of which improvements the following is a specification.

Figure 5:
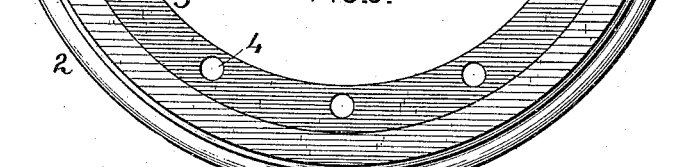
Figure 6:
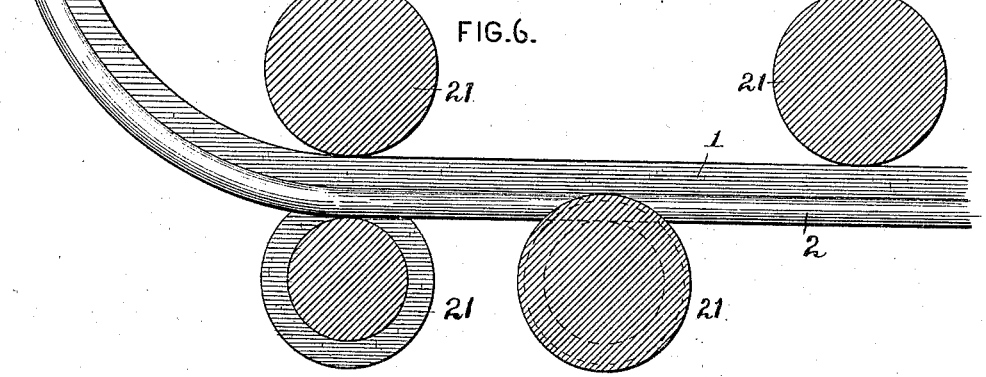
Figure 9:
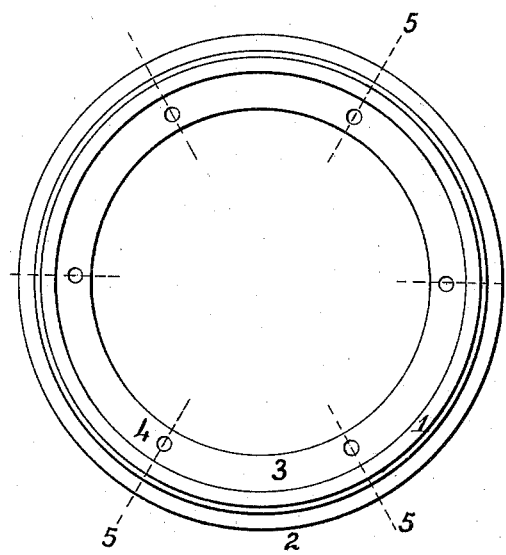
Figure 10:
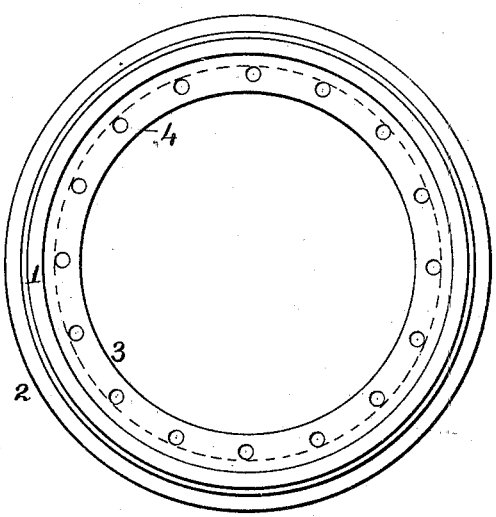
Figure 11:
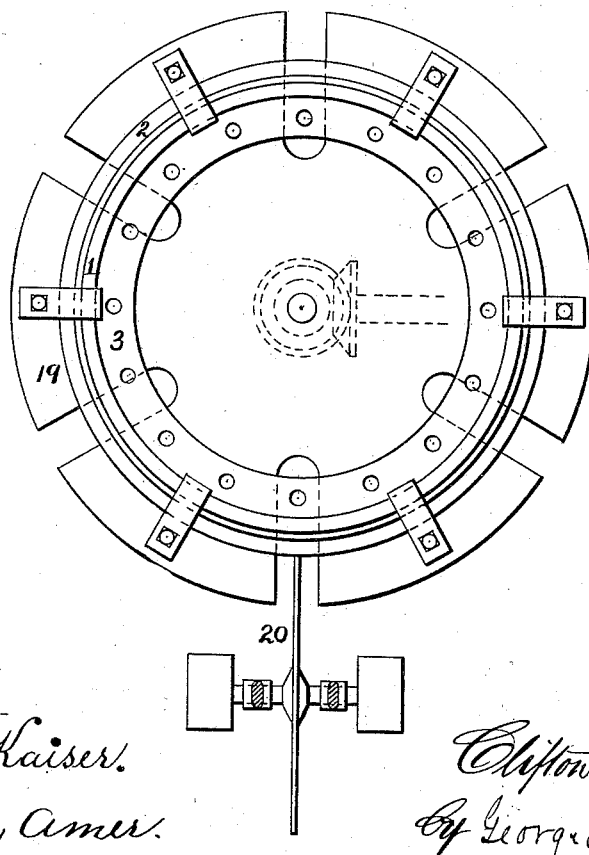

In the accompanying drawings, which make part of this specification, Figures 1, 2, 3, and 4, Sheet 1, are transverse sections through different forms of railroad-wheel tires adapted to the practice of my invention; Fig. 5, a plan view of the tire shown in Fig. 2; Fig. 6, a transverse section through a series of straightening-rolls; Figs. 7 and 8, Sheet 2, views, partly in elevation and partly in section, of an apparatus for effecting the detachment of the inner flanges of tires; Figs. 9 and 10, Sheet 3, plan views of tires, illustrating, respectively, different methods of dividing the same; Fig. 11, a plan view of a table and saw for dividing a tire radially; Figs. 12 and 13, Sheet 4, side views in elevation of roll-trains adapted for the reduction of tires to bars of rectangular section; and Figs. 14 and 15, sections of tires from which the whole and a portion, respectively, of the inner flanges have been detached.

In an application for Letters Patent filed by me July 18, 1884, Serial No. 138,000, I have set forth a process for effecting the utilization of worn or defective railroad-wheel tires by the conversion of the same into bars or billets adaptable to various uses; and the object of my present invention is to provide effective and desirable mechanism for the practice of said process.

To this end my improvements consist in certain novel devices and combinations for detaching from a tire the whole or a portion of its inner flange, dividing the tire circumferentially, and reducing it from annular form and irregular section to a straight rectangular bar or billet of greater length and less area of transverse section than the tire from which it is formed.

The improvements claimed are hereinafter fully set forth.

Figure 1:
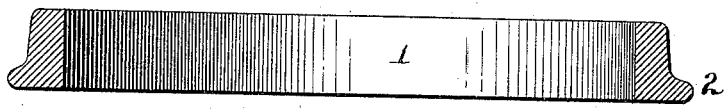
Figure 2:
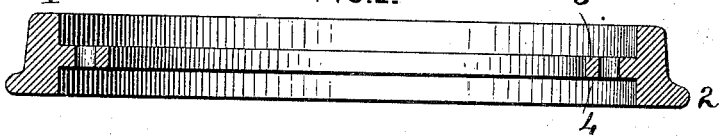
Figure 3:
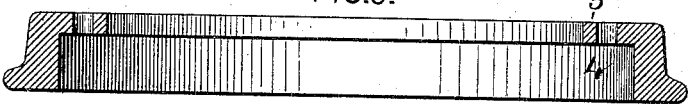
Figure 4:
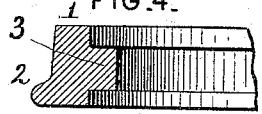

In the practice of my invention as applied to tires 1, having the usual external flanges, 2, and internal flanges, 3, provided with a series of bolt-holes, 4, as in Figs. 2 to 5, inclusive, I first provide for the elimination of the open spaces formed by said bolt-holes from the body of metal to be subsequently reduced to a bar. In the tires of wheels of the Paige type, Figs. 4 and 9, the inner flange, 3, is comparatively heavy, being from two to three inches in thickness, and hence contains a considerable quantity of metal which it is desirable to utilize. To this end tires of such character are by preference divided by radial cuts 5, passing through the centers of the several bolt-holes, 4, into a series of segments, each of which constitutes a separate bar or bloom, the semicircular recesses formed by the division of the bolt-holes being located in its ends, and therefore presenting no obstacle to its reduction by rolling, and all the metal of the inner flange being retained. The inner flanges of the tires of wheels of the Allen type are of smaller dimensions, being usually about five-eighths of an inch in thickness, and in tires of this class, as shown in Figs. 2, 3, and 10, I prefer to detach either a portion or the whole of the inner flange from the tire, and, for convenience of manipulation, to cut the tire apart at one point only after such detachment, so as to form only a single bloom, in lieu of a series, as in the case of tires having materially thicker inner flanges. The detachment of the inner flanges may be most desirably effected by the apparatus shown in Figs. 7 and 8. A hammer, 7, is fixed upon the piston-rod 8 of a piston working in a steam-cylinder, 9, which is supported upon housings or standards 10 above an anvil, 11, and is provided with valve mechanism of any suitable description operated by a hand-lever, 12. A cylindrical recess, 13, the diameter of which is equal to or slightly greater than the inside diameter of the tire 1, is formed in the anvil 11, concentric with the hammer 7, a plane table or bearing, 14, upon which the tire is supported, being formed at the top of the recess 13. A hammer-block, 15, which, when the whole of the inner flange, 3, is to be detached, is of such diameter as to fit closely within the tire, is placed upon the flange 3, to transmit thereto the impact of the hammer, and by a blow or blows of the hammer upon said block the flange 3 is severed from the tire and drops, with the block 15, into the lower portion of the recess 13, from which it may be removed through a lateral opening, 16. The hammer-block is removed from the recess, to admit of the insertion of another tire, by means of hooks or catches 17, pivoted or coupled by flexible connections to the hammer 7, and adapted to engage pins or catches 18 on the hammer-block, and thereby to lift and suspend the same above the recess until the next tire to be operated on is placed in position therein, after which it is lowered and deposited upon the flange, the hooks disconnected from the catches, and the hammer raised preparatory to effecting the detachment of the inner flange, as before. It will be obvious that the hammer-block 15 may, if preferred, be dispensed with and the hammer caused to act directly upon the flange; but I deem the employment of an intermediate block more desirable, by reason of the facility and accuracy of adjustment thereby afforded.

If it be desired to detach only a portion of the inner flange, 3, as in Fig. 8, a circle, 6, Fig. 10, is scored or deeply marked thereon with a suitable tool, so as to effect a partial severance of and institute a line of least resistance to fracture upon the flange, said line being preferably located substantially tangential to the outside of the series of bolt-holes 4, so as to allow as large a proportion as practicable of the metal of the flange, consistently with the elimination of the bolt-holes, to be retained upon the tire. The hammer-block 18 being in such case made of corresponding diameter with the circle marked upon the flange, the detachment of the inner portion of the latter from the tire is effected upon said circle as a parting-line by the impact of the hammer on the block.

Upon the detachment of the inner flange, either in whole or in part, as above described, the tire is removed from the anvil, placed in a suitable furnace, and, after having been brought to a proper heat, fixed upon a revolving table, 19, and divided radially at one or more points by a saw, 20, or other cutting mechanism suitable for the purpose. In the case of tires having heavy internal flanges, I contemplate, as before stated, the retention of the entire body of metal of the inner flange, and therefore, in lieu of detaching a portion of said flange for the purpose of eliminating the bolt-holes, I cut or divide the tire radially through each of the bolt-holes, thereby forming a series of separate segmental blooms, such operation being conveniently effected by the use of the revolving table 19.

The next succeeding operation is to convert the divided tire into a straight bar or bloom, which is effected by opening it out at the line of division (when cut only at a single point) and passing it through a series of straightening-rolls, 21, Fig. 6, by which it is brought into proper condition to be submitted to the reducing-rolls, and the separate segments of a tire which is divided at more than one point may be straightened in a similar manner. The tire, being now in the form of a straight bar or series of bars without openings, and having a flange on one or on two sides, according as the whole or a portion, respectively, of its inner flange has been detached, is reduced to the section desired by the rolls shown in Figs. 12 and 13, the former being adapted for the reduction of tires from which the whole of the inner flange has been removed, as in Fig. 14, and the latter for that of tires from which a portion only of said flange has been detached, as in Fig. 15. In each instance a pair of roughing-rolls, 22, and a pair of finishing-rolls, 23, mounted in suitable housings and provided with proper driving-gearing, are employed. To prevent the buckling or folding over of the external and internal flanges, 2 3, of the tires upon the body of metal thereof, supporting grooves or channels 24 25, adapted to receive and reduce said flanges, are formed upon the roughing-rolls 22, the grooves 24 serving to force down the external flange, 2, into the body of the tire, and the grooves 25 acting similarly upon the internal flange, 3. Two or more supporting-grooves of successively-decreasing depth may be provided, the grooves 25 being dispensed with, as in Fig. 12, if the inner flange has been wholly detached from the tire. The remaining groove or grooves of the roughing-rolls are of the ordinary rectangular section, and the grooves of the finishing-rolls 23 are of such form and dimensions as are requisite to reduce by successive passes the bloom of rectangular section produced by the roughing-rolls to the finished shape or section desired, their construction in such particular being familiar to those skilled in the art of metal-rolling, and not forming, *per se*, part of my present invention.

In the application of my invention to wheels not having a separate tire, in which the body or center and the rim or tread are formed in a single piece, the web of the wheel is marked or scored adjacent to the rim and detached therefrom, as before described, and the rim, which is then substantially similar to a separate tire, is reduced to the condition of a bar or billet by the apparatus before set forth.

I claim herein as my invention—

1. An apparatus or plant for converting flanged steel tires into billets or bars, in which are combined the following elements, to wit: an anvil having a cylindrical recess, and a table or bearing adapted to support a tire at the top of said recess, a steam-hammer located above and concentric with said recess, a tire-supporting table, and a saw or cutter for severing a tire resting thereon, roughing-rolls having supporting grooves or channels for the reception and reduction of tire-flanges, and finishing-rolls grooved to reduce the quadrangular section produced by the roughing-rolls to a billet or bar of desired section, substantially as set forth.

2. In an apparatus or plant for converting flanged steel tires into billets or bars, the combination of a tire-supporting table and a saw or cutter for severing a tire resting thereon, roughing-rolls having supporting grooves or channels for the reception and reduction of tire-flanges, and finishing-rolls grooved to reduce the quadrangular section produced by the roughing-rolls to a billet or bar of desired section, substantially as set forth.

3. In an apparatus or plant for converting flanged steel tires into billets or bars, the combination of a table for supporting a railroad-tire and a saw or cutter for severing said tire radially while supported upon the table preparatory to effecting the reduction and change of form of its transverse section, substantially as set forth.

4. In an apparatus or plant for converting flanged steel tires into billets or bars, the combination of a table for supporting a railroad-tire, a saw or cutter for severing said tire radially while supported upon the table, and a series of straightening-rolls, substantially as set forth.

5. In an apparatus or plant for converting flanged steel tires into billets or bars, the combination of a table for supporting a railroad-tire, a saw or cutter for severing said tire radially while supported upon the table, and gearing for rotating the table and tire, these members being combined for joint operation, to divide the tire into a series of segmental blooms preparatory to effecting the reduction and change of form of its transverse section, substantially as set forth.

6. In an apparatus or plant for converting flanged steel tires into billets or bars, the combination of an anvil having a cylindrical recess, and a table or bearing adapted to support a railroad-tire at the top of said recess, and a steam-hammer located above and concentric with said recess and table, and adapted to detach the whole or a portion of the inner flange of the tire preparatory to effecting the reduction and change of form of its transverse section, substantially as set forth.

7. In an apparatus or plant for converting flanged steel tires into billets or bars, the combination of an anvil having a cylindrical recess, and a table or bearing adapted to support a railroad-tire at the top of said recess, a steam-hammer located above and concentric with said recess and table, roughing-rolls having supporting grooves or channels for the reception and reduction of tire-flanges, and finishing-rolls grooved to reduce the quadrangular section produced by the roughing-rolls to a billet or bar of desired section, substantially as set forth.

8. In an apparatus or plant for converting flanged steel tires into billets or bars, the combination of a recessed anvil having a tire-supporting table or bearing at the top of its recess, a steam-hammer located above and concentric with said recess and table, and a hammer-block adapted to fit within a tire supported upon said table, substantially as set forth.

9. In an apparatus or plant for converting flanged steel tires into billets or bars, the combination of a recessed anvil having a tire-supporting table at the top of its recess, a steam-hammer located above and concentric with said recess and table, connecting-hooks coupled to said hammer, and a hammer-block fitting within the recess of the anvil, and having pins or catches to engage the connecting-hooks, substantially as set forth.

10. In an apparatus or plant for converting flanged steel tires into billets or bars, a pair of roughing-rolls for rolling tire-sections, said rolls having supporting grooves or channels for the reception and reduction of the flanges of the tires, substantially as set forth.

11. In an apparatus or plant for converting flanged steel tires into billets or bars, the combination of roughing-rolls having supporting grooves or channels for the reception and reduction of tire-flanges and finishing-rolls grooved to reduce the quadrangular section produced by the roughing-rolls to a billet or bar of desired section, substantially as set forth.

In testimony whereof I have hereunto set my hand.

CLIFTON B. BEACH.

Witnesses:
T. H. BUSHNELL,
WM. E. CUSHING.